(12) United States Patent
Christie, Jr. et al.

(10) Patent No.: US 7,002,771 B2
(45) Date of Patent: Feb. 21, 2006

(54) METHOD AND APPARATUS FOR SENSING POSITION OF A TAPE HEAD IN A TAPE DRIVE

(75) Inventors: Leslie G. Christie, Jr., Greeley, CO (US); William Proctor, Boise, ID (US); Ted A. Brooks, Emmett, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 10/644,627

(22) Filed: Aug. 19, 2003

(65) Prior Publication Data

US 2005/0041323 A1    Feb. 24, 2005

(51) Int. Cl.
*G11B 5/584*    (2006.01)
*G11B 5/55*    (2006.01)

(52) U.S. Cl. .............................. 360/77.12; 360/78.02; 250/205

(58) Field of Classification Search ............. 360/77.01, 360/77.12, 78.02, 75, 240, 78.01, 250, 260, 360/290, 291
See application file for complete search history.

(56) References Cited

U.S. PATENT DOCUMENTS

| 4,176,381 | A | * | 11/1979 | de Niet et al. | ........... 360/77.12 |
| 4,677,505 | A | * | 6/1987 | Nukada et al. | ........... 360/77.12 |
| 5,592,351 | A | * | 1/1997 | Carter | ...................... 360/261.3 |

* cited by examiner

Primary Examiner—Andrew L. Sniezek

(57) ABSTRACT

A method for sensing position that comprises generating light, eclipsing the light according to position, sensing the amount of light not eclipsed, and inferring position according to the sensed amount of light.

20 Claims, 8 Drawing Sheets

METHOD AND APPARATUS FOR SENSING POSITION OF A TAPE HEAD IN A TAPE DRIVE

BACKGROUND

Magnetic tape drives are used to store and retrieve information from magnetic tape. The information is recorded on and read from the tape as it moves over a magnetic read/write head. The magnetic "head" may be a single head or, as is common, a series of read/write head elements stacked individually and/or in pairs within the head unit. Data is recorded on tracks on the tape by moving the tape lengthwise past the head. The head elements are selectively activated by electric currents that represent the information to be recorded on the tape. The information is read from the tape by moving the tape longitudinally past the head elements so that magnetic flux patterns on the tape create electric signals in the head elements. These signals represent the information stored on the tape.

Data is recorded on and read from parallel tracks on the tape by positioning the head elements at different locations across the tape. Head elements are moved from track to track as necessary either to record or to read the desired information. An actuator operatively coupled to some type of servo control circuitry controls movement of the magnetic head. Tape drive head positioning actuators often include a lead screw driven by a stepper motor, a voice coil motor, or a combination of both. The head is positioned by the actuator along a path perpendicular to the direction that the tape travels.

Modern tape drives operate at high speeds and pass data to and from the tape where the data is stored. In order to maintain the precise degree of control required to operate in such an extreme environment, servo information recorded on the tape is employed to position the head elements as close as possible to the center of a track. A tape drive servo control system must receive accurate servo information from the tape in order to be able accurately to position the tape head. This requirement may have an inherent dilemma: the tape head must be positioned properly in order for the servo control system to be able to read servo information from the tape. At the same time, the servo control system must be able to read servo information from the tape in order properly to position the head. To break this cycle, a supplementary head positioning system often is used that places the head at a position close enough to the correct position that servo information can be read from the tape. The servo system then reads the servo information from the tape and finely adjusts the head position in order that data can be written to or read from the tape.

One example of a supplementary head positioning system employs a sensor for determining the mechanical position of the head. The sensor can include a variable inductor. A magnetic core secured to the actuator of the head positioning system moves with the actuator (and therefore with the head) in and out of a coil of wire. This motion changes the inductance of the coil. A processor measures the change in inductance and infers therefrom an estimate of the mechanical position of the tape head. The effect of hysteresis in magnetic cores leads to "backlash" when such a system is used to estimate mechanical position. Additionally, saturation and other nonlinear effects limit the accuracy with which heads can be positioned using magnetic methods. The variable inductance device also is quite expensive and so constitutes a less than totally satisfactory solution to the supplementary head positioning problem.

SUMMARY

Presently disclosed is a method for sensing position that comprises generating light, eclipsing the light according to position, sensing the amount of light not eclipsed, and inferring position according to the sensed amount of light.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
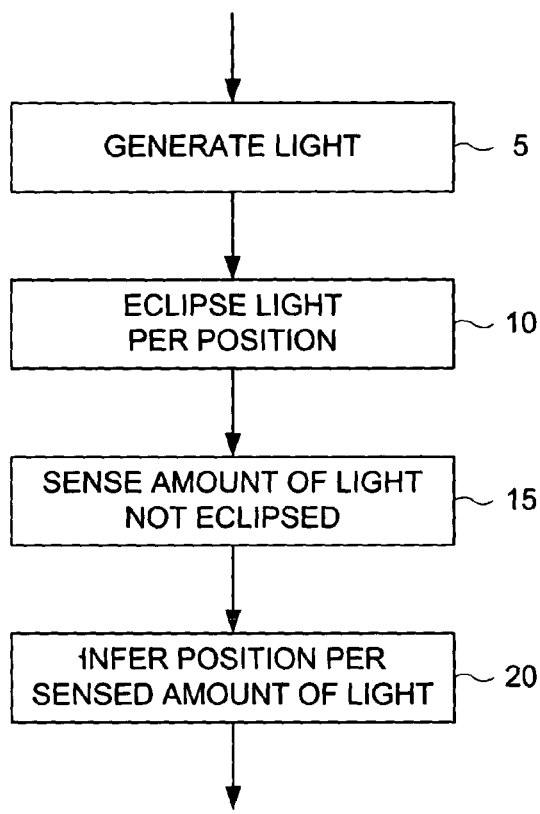
FIG. 1 is a flow diagram of a representative embodiment of a method for sensing position.

FIG. 1 is a flow diagram of a representative embodiment of a method for sensing position. According to this method, light is generated (step 5) and is partially eclipsed according to the position being determined (step 10). The amount of light that is not eclipsed is sensed (step 15) and the position is inferred (step 20) according to the sensed amount of light. In another example variation of the present method, light is generated by passing a current through semiconductive material, thereby causing the material to emit light. According to another variation of the present method, the light is eclipsed by monotonically blocking an amount of light according to position. "Monotonic" blocking of light implies that the amount of light not eclipsed does not decrease or stay the same with a change in position in a first direction and does not increase or stay the same with a change in position in a second direction opposite to the first direction. According to one variation of the present method, a change in position in a first direction causes an increase in the amount of light that is not eclipsed. Conversely, a change in position in a second direction opposite to the first direction causes a decrease in the amount of light not eclipsed. This example is presented to illustrate the present method and is not intended to limit the scope of the claims appended hereto.

Figure 2:
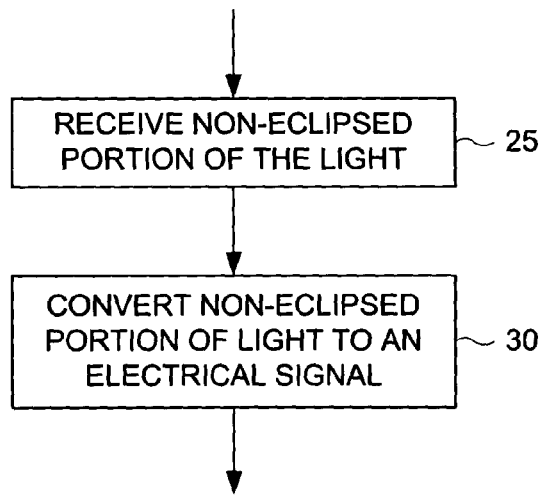
FIG. 2 is a flow diagram of a representative embodiment of a method for sensing an amount of light.

FIG. 2 is a flow diagram of a representative embodiment of a method for sensing an amount of light. According to this variation of the present method, sensing an amount of light comprises receiving a non-eclipsed portion of light (step 25) wherein the portion of non-eclipsed light correlates with the position being sensed. The received light is converted to an electrical signal (step 30) that can be processed to infer position.

Figure 3:
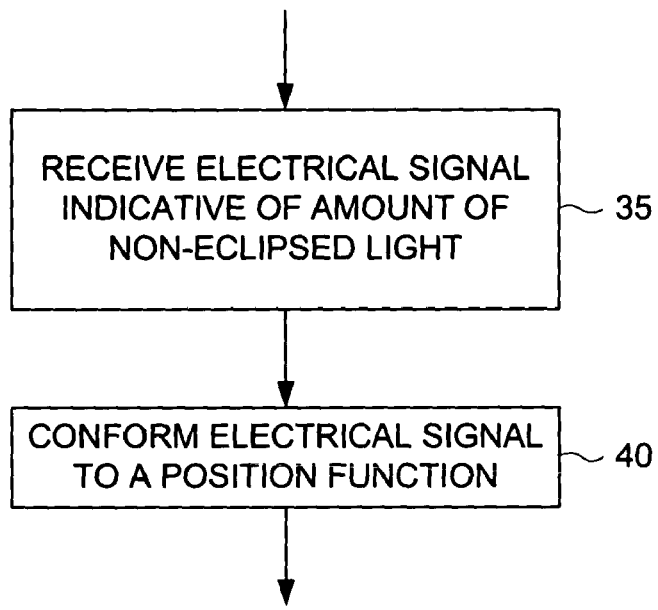
FIG. 3 is a flow diagram of a representative embodiment of a method for inferring position.

FIG. 3 is a flow diagram of a representative embodiment of a method for inferring position. According to this variation of the present method, an electrical signal is received, said signal being indicative of the amount of non-eclipsed light (step 35). Because the non-eclipsed light relates to the position being sensed, receiving the electrical signal comprises receiving information about position. The electrical signal is conformed to a position function (step 40) from which the position can be inferred. According to one example variation of the present method, the position function is a linear function, and the position inferred relates linearly to the amount of non-eclipsed light received. It should be noted that the linear position function is presented here to illustrate the present method and not to limit the scope of the claims appended hereto. Any suitable position function may be applied, and it is the intent to include such suitable position functions within the scope of the claims appended hereto.

Figure 4:
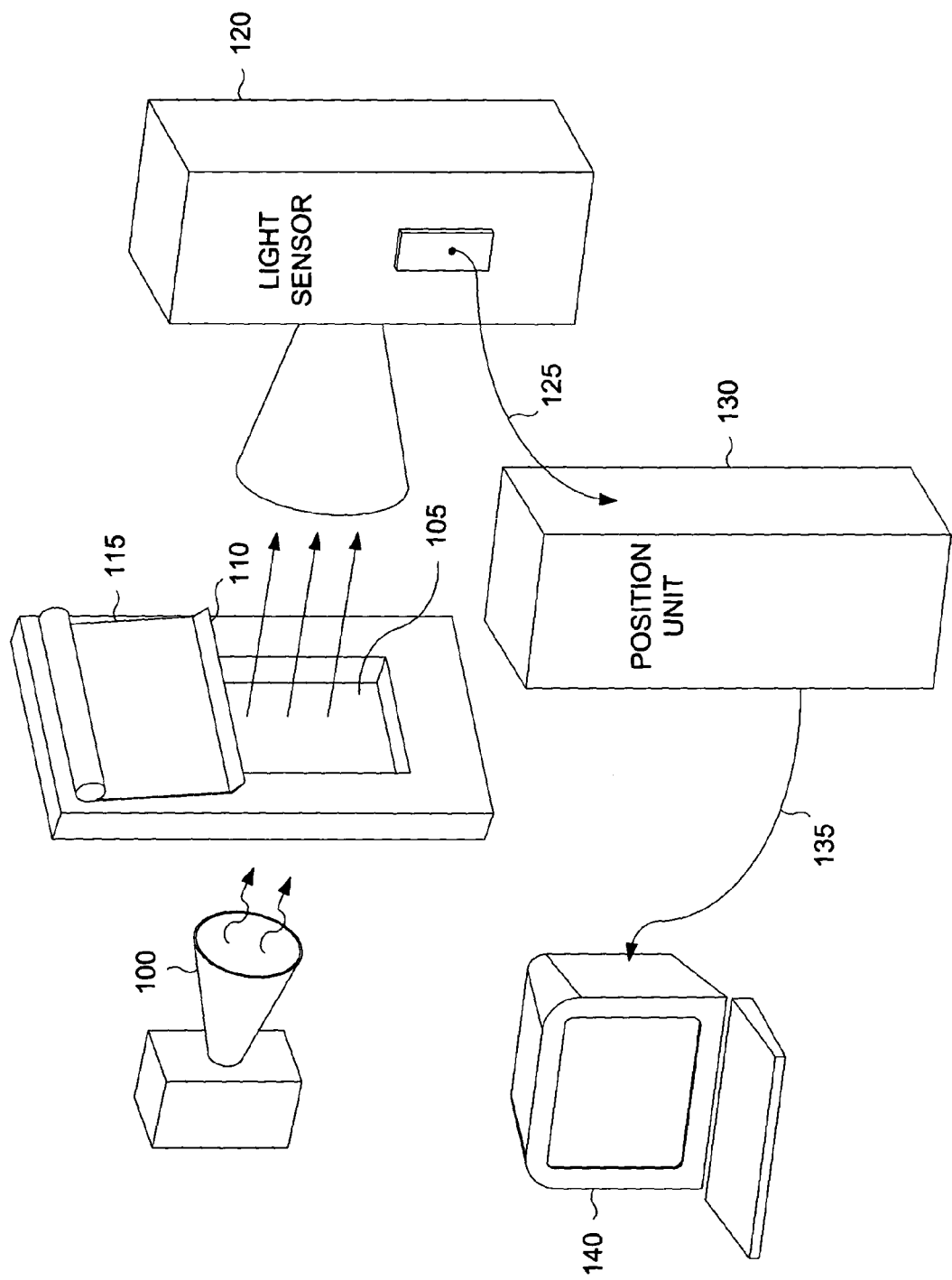
FIG. 4 is a pictorial diagram of an exemplary embodiment of an apparatus that infers position.

FIG. 4 is a pictorial diagram of an exemplary embodiment of an apparatus that infers position. This embodiment comprises a light source 100 that generates light. According to one alternative embodiment of the apparatus, the light is generated by a semiconductive material that generates light when current passes through the material. According to one example alternative embodiment, the semiconductive material comprises a light-emitting diode. This example embodiment of the present apparatus further comprises an eclipsing device 115 disposed to obscure a portion of an aperture 105. The eclipsing device 115 thus controls the amount of non-eclipsed light that is allowed to pass through the aperture. According to one alternative embodiment, the eclipsing device 115 is capable of monotonically blocking an amount of light according to position.

According to yet another alternative embodiment of the apparatus, the aperture 105 is rectangular and is oriented in a vertical plane. The eclipsing device 15 is configured to eclipse light from the light source 100 that impinges upon the aperture 105 at a point above the lower edge 110 of the eclipsing device 115. This configuration causes the eclipsing device 115 to control the effective size of the aperture 105 according to the position of the lower edge 110 of the eclipsing device 115. According to the example embodiment illustrated in FIG. 4, the amount of light not eclipsed by the eclipsing device 115 increases as the position of the lower edge 110 of the eclipsing device 115 rises. When the position of the lower edge 110 of the eclipsing device 115 lowers, then the amount of light not eclipsed by the eclipsing device 115 decreases. According to this illustrative embodiment, the aperture 105 is rectangular, and the amount of light that is not eclipsed by the eclipsing device 115 varies in a manner that is linear with the position of the lower edge 110 of the eclipsing device 115. This example embodiment illustrates one example of a monotonic relationship between the position being sensed and the amount of light not eclipsed. It should be noted that the shape of the aperture 105 can vary with application of the present method. Hence, the shape of the aperture 105 and the scope of the appended claims is not intended to be limited to this one example of an aperture shape.

The apparatus of the present embodiment further comprises a light sensor 120 and a position unit 130. The light sensor 120 is disposed to receive a non-eclipsed portion of the light that is allowed to pass through the aperture 105 by the eclipsing device 115. According to one alternative illustrative embodiment, the light sensor 120 receives the non-eclipsed portion of the light and converts the non-eclipsed portion of light into an electrical signal 125. Hence, the electrical signal is generated according to the amount of light received by the light sensor 120. The position unit 130, according to one alternative embodiment of the present apparatus, is capable of receiving the electrical signal 125 and of processing the electrical signal 125 according to a position function (i.e. conforming the electrical signal to a position function). In one illustrative alternative embodiment, the light from the light source 100 distributes over the aperture 105 with uniform intensity, and the electrical signal 125 relates linearly to the amount of light received by the light sensor 120. In that instance, the position function is linear and a change in the position of the lower edge 110 of the eclipsing device 115 causes a proportional change in the electrical signal 125.

According to one illustrative embodiment of the present apparatus, the position unit 130 generates a position indication 135 that can be presented on a display device 140. It should be noted that the apparatus depicted in FIG. 4 need not conform the amount of non-eclipsed light to a linear function. In fact, any monotonic position function may be used, and all such variations are to be included in the scope of the appended claims. Other examples of position functions include, but are not limited to a segmented position function where portions of the function remain linear between two end points but the slope of the linear function varies over the entire range of the position function. Such a segmented position function, according to one example embodiment, is implemented using a lookup table. This lookup table is called a "conformance table". A conformance table of this type, according to one alternative embodiment, is filled with empirical data that correlates an electrical signal value with a position value.

Figure 5:
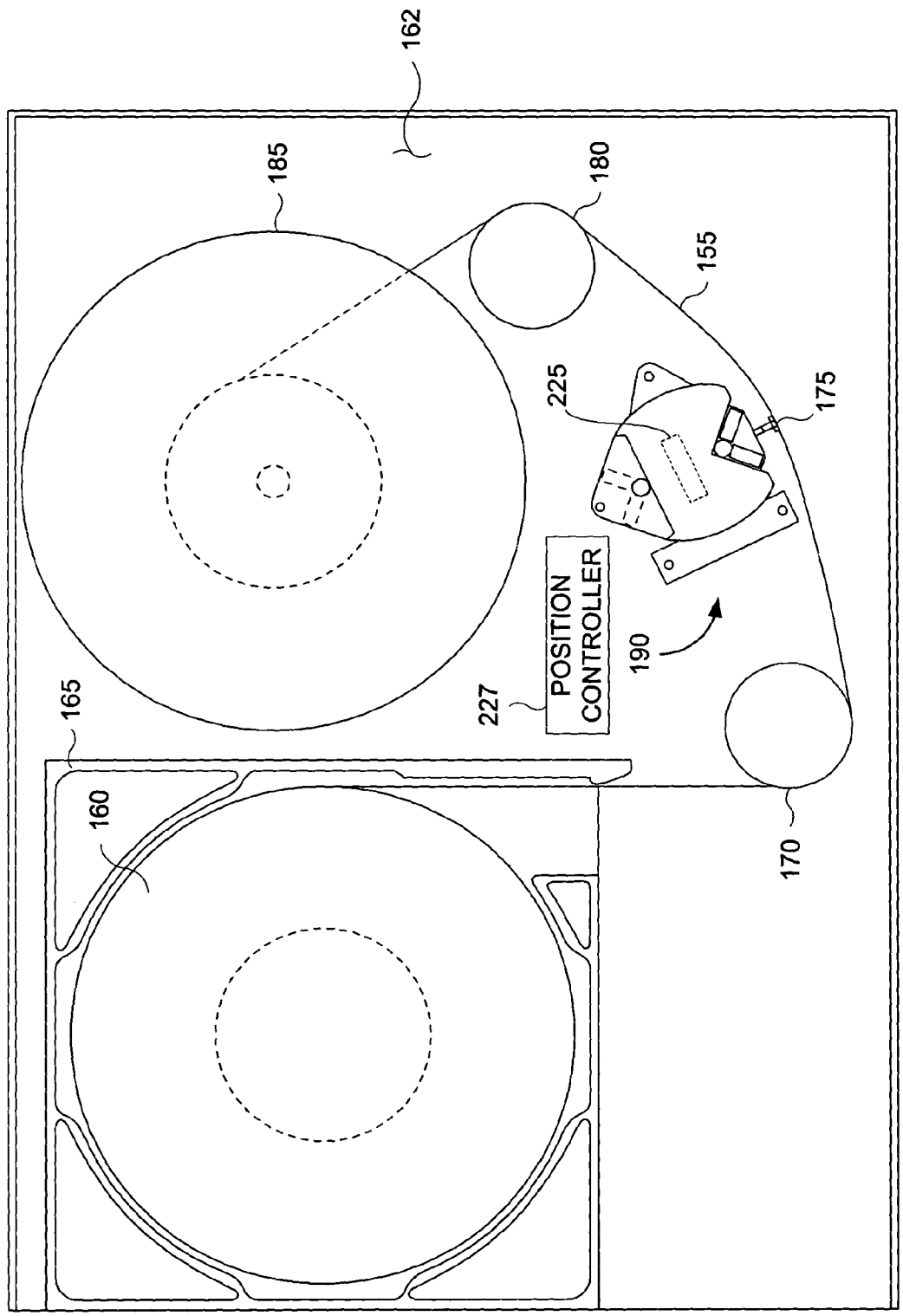
FIG. 5 is a pictorial diagram of an exemplary embodiment of a tape drive.

FIG. 5 is a pictorial diagram of an exemplary embodiment of a tape drive. According to one example embodiment, a tape drive comprises a tape transport mechanism 162, a tape head 175, an actuator assembly 190, an optical position sensing mechanism 225 and a position controller 227. This example embodiment of a tape drive is capable of receiving a tape cartridge 165 that includes a magnetic tape 155 wound on a single supply spool 160. The tape transport mechanism 162 transports magnetic tape included in the tape cartridge 165. In operation, the tape transport mechanism 162 passes the tape 155 around a first tape guide 170, over the tape head 175, around a second tape guide 180 and up to a take up spool 185. The tape head 175 is mounted to the actuator assembly 190. As the tape 155 moves across the face of the tape head 175, data is recorded on the tape 155 or read from the tape 155 depending on whether the tape drive is operating in a write mode or a read mode. It should be noted that the structure of the tape transport mechanism 162 is presented here for illustration purposes only and is not intended to limit the scope of the appended claims. The scope of the appended claims is intended to encompass other tape transports structures.

Figure 6:
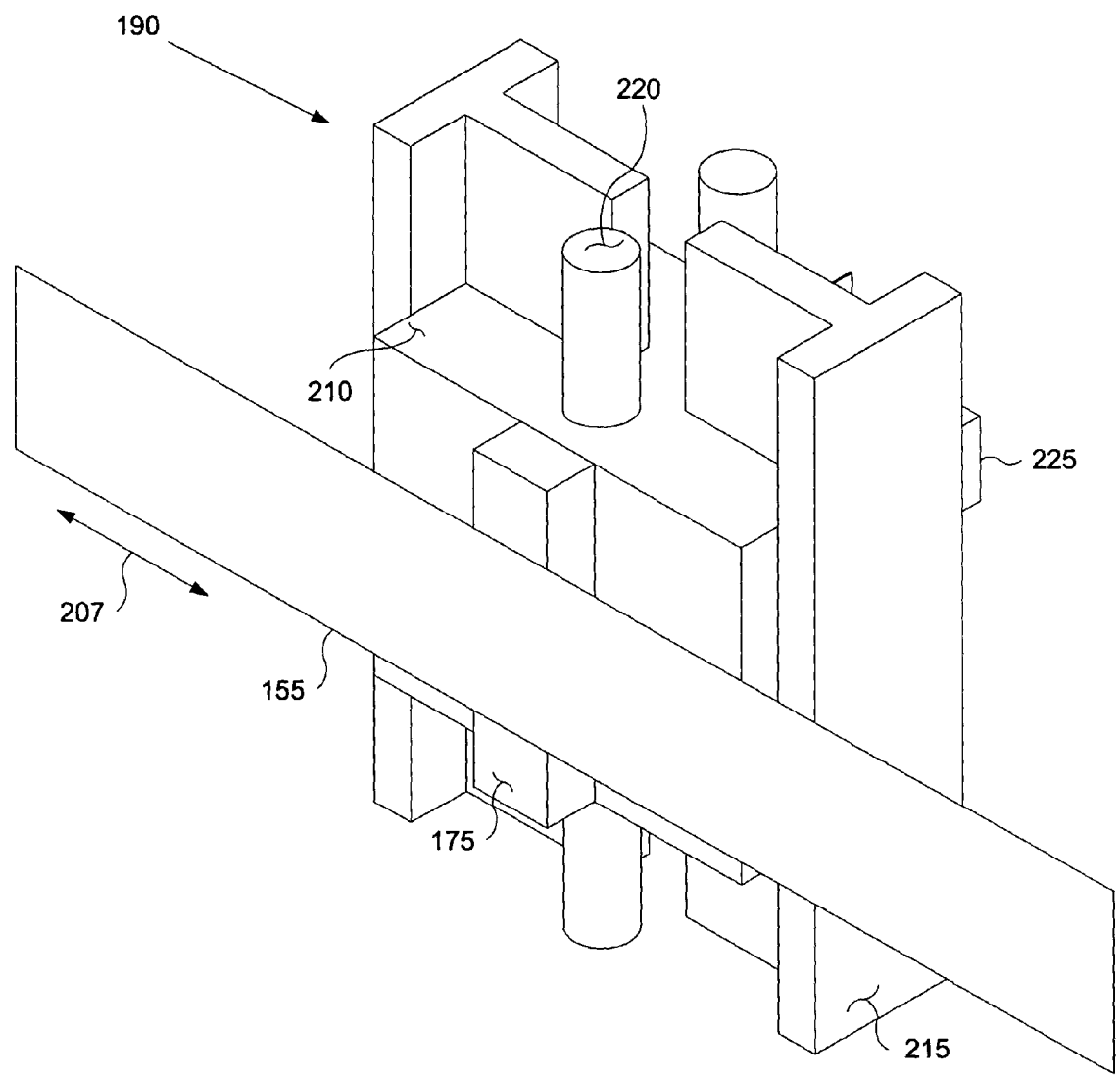
FIG. 6 is an enlarged pictorial diagram of an exemplary embodiment of an actuator assembly.

FIG. 6 is an enlarged pictorial diagram of an exemplary embodiment of an actuator assembly. According to one example embodiment, the actuator assembly 190 comprises an actuator 210 and a coil 215. The actuator 210 moves under the influence of a magnetic force generated by a current in the coil 215. The current is typically controlled by a signal generated by the position controller 227 as described infra. The actuator assembly 190, according to one example embodiment, further comprises a linear bearing 220 that guides the motion of the actuator 210. The tape head 175 included in the present tape drive is mounted to the actuator 210. The actuator assembly is mounted to the tape drive in a manner so that the tape head 175 moves in a direction transverse to the direction of motion 207 of the tape 155. The optical position sensing mechanism 225, according to one example embodiment, is integral to or is mounted on the actuator assembly 190. The optical position sensing mechanism 225 generates an electrical signal according to the position of the tape head 175 mounted on the actuator assembly 190. This electrical position signal is used as a basis for a position control signal generated by the position controller 227. The position control signal generated by the position controller 227 controls the current flowing in the coil 215 and, as a result, controls the position of the tape head 175.

Figure 7:
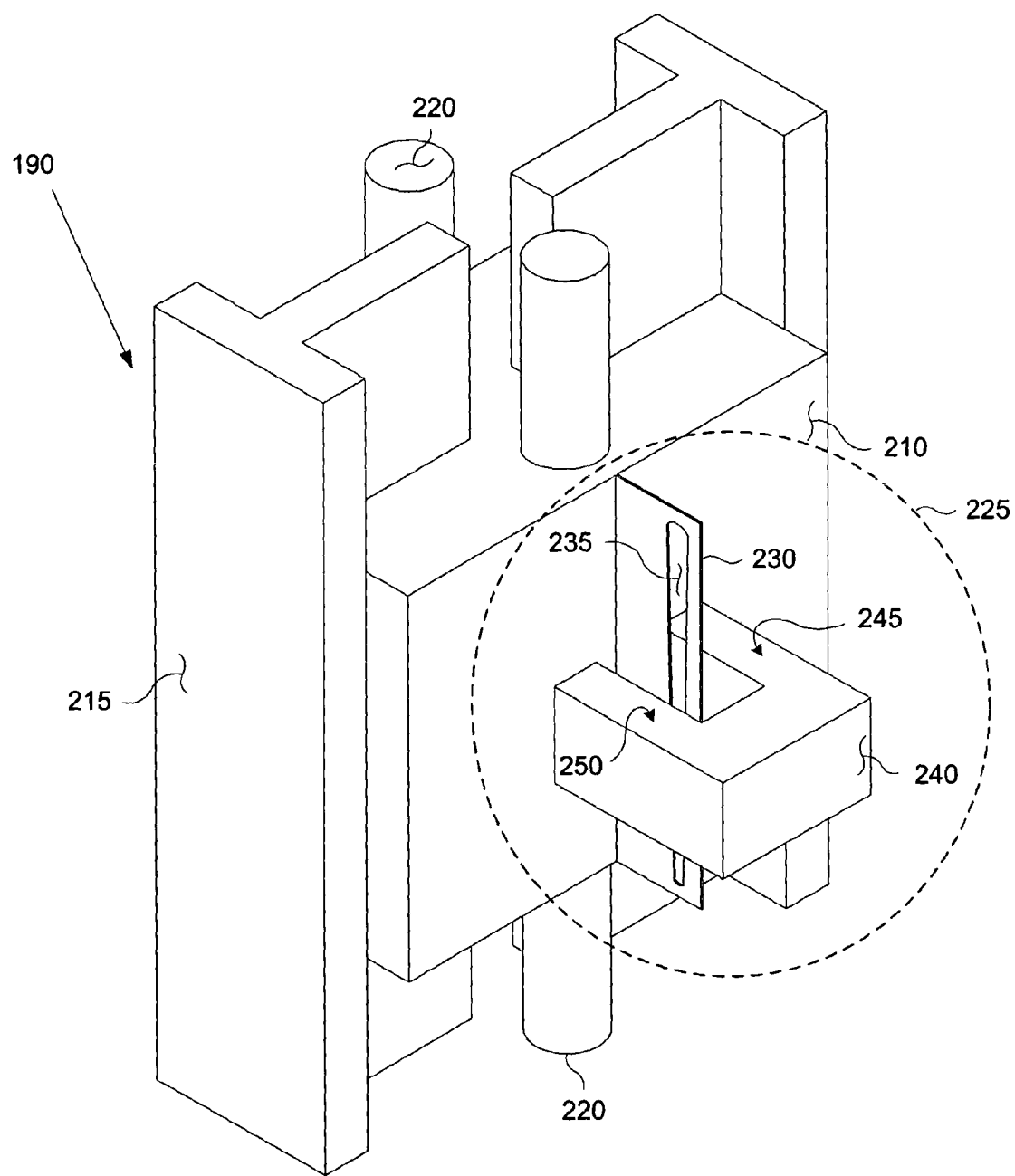
FIG. 7 is an alternative view of an exemplary embodiment of an actuator assembly.

FIG. 7 is an alternative view of an exemplary embodiment of an actuator assembly. As depicted in this figure, one example embodiment of an actuator assembly 190 comprises an actuator 210, a coil 215 and an optical position sensing mechanism 225 as already described. The optical position sensing mechanism 225 comprises a flag 230 that is rigidly secured to the actuator 210 and that includes a tapered slot 235. The optical position sensing mechanism 225, according to one alternative embodiment, comprises an optical interrupter 240 that comprises a light source 245 and a detector 250, both of which occupy a U-shaped enclosure. The light source 245 in the optical interrupter 240 occupies one side of the U, and the detector 250 occupies the other side of the U such that the light source 245 and detector 250 are in opposition to each other.

The optical interrupter 240 remains stationary relative to the actuator 210 and the flag 230, which is attached to the actuator 210. It should be noted that the support structure that maintains the position of the optical interrupter 240 is not shown in the figure in the interest of clarity. Light generated by the light source 245 is partially eclipsed by the flag 230, and a non-eclipsed portion of light passes through the tapered slot 235 and is received by the detector 250. In one alternative example embodiment of the optical position sensing mechanism 225, the light source comprises a light emitting diode, and the detector comprises a photodiode. The amount of light that passes through the tapered slot 235 varies according to the position of the flag 230 relative to the optical interrupter 240. Because the flag 230, the actuator 210, and the tape head 175 are rigidly secured together, the non-eclipsed light received by the detector varies according to the position of the tape head 175.

Figure 8:
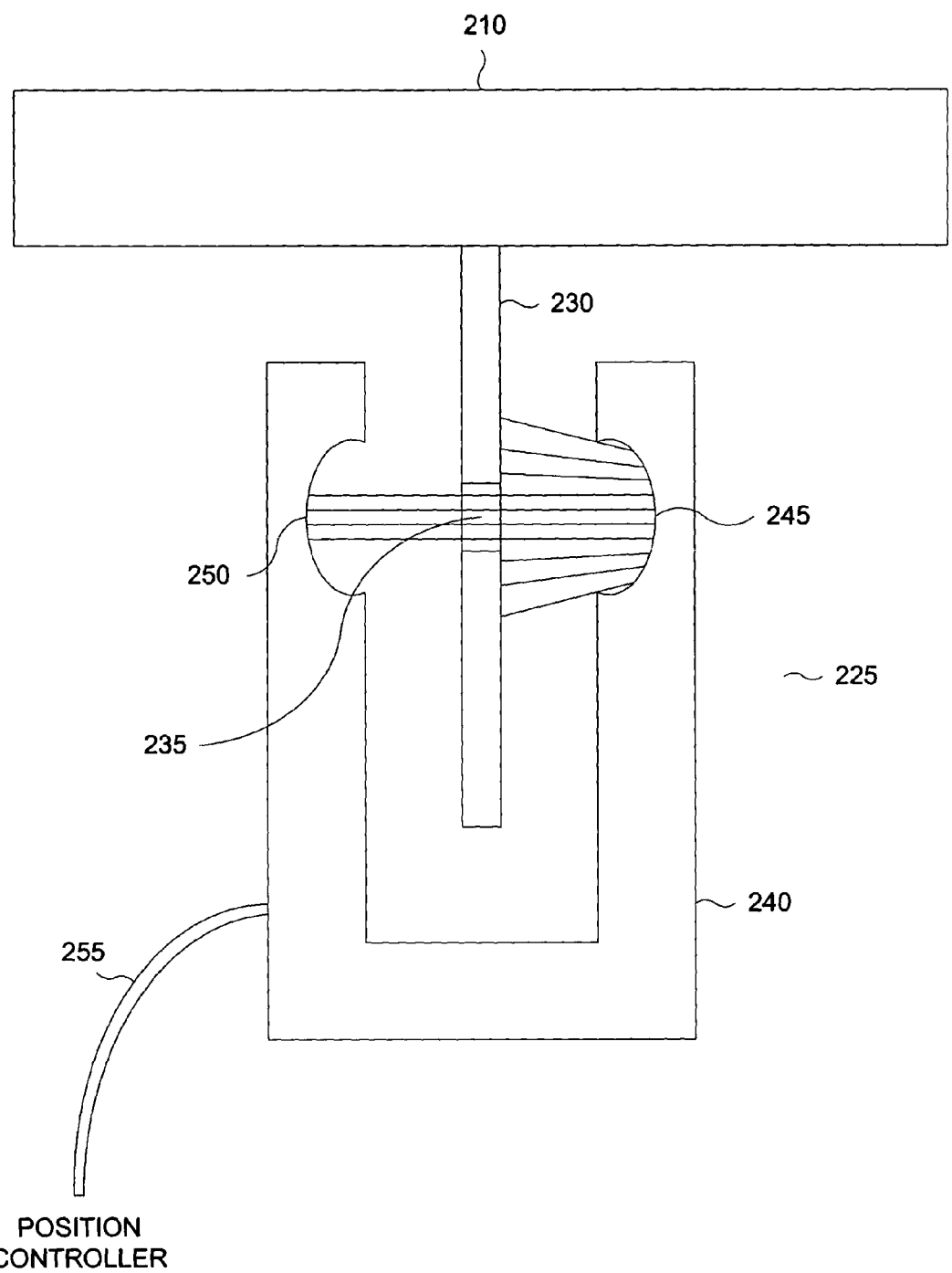
FIG. 8 is a pictorial diagram of a horizontal section cut through an exemplary embodiment of an optical position sensing mechanism.

FIG. 8 is a pictorial diagram of a horizontal section cut through an exemplary embodiment of an optical position sensing mechanism. This embodiment comprises an optical interrupter 240 housed in a U-shaped enclosure, said optical interrupter 240 comprising a light source 245 and a detector 250. It should be noted that, according to one alternative embodiment of an optical position sensing mechanism 225, the light source 245 and the detector 250 are separately packaged. The present embodiment further comprises a flag 230 that is rigidly attached to an actuator 210 that is rigidly attached to the tape head 175 (not shown in this figure). The flag 230 includes therein a tapered slot 235 that moves up and down (out of and into the plane of the diagram) with the flag 230 and the actuator 210. As the position of the flag 230 varies relative to the optical interrupter 240, the width of that part of the tapered slot 235 that is disposed between the light source 245 and the detector 250 also varies and eclipses an amount of light that likewise varies. The amount of light reaching the detector 250 therefore varies according to the position of the flag 230 and the actuator 210 and, therefore, of the tape head 175. The optical interrupter generates an electrical signal according to the amount of light sensed by the detector 250, and the electrical signal is communicated to the position controller 227 by means of an electrical cable 255. The electrical cable also provides power to the light source 245, according to one alternative embodiment.

Figures 9, 10:
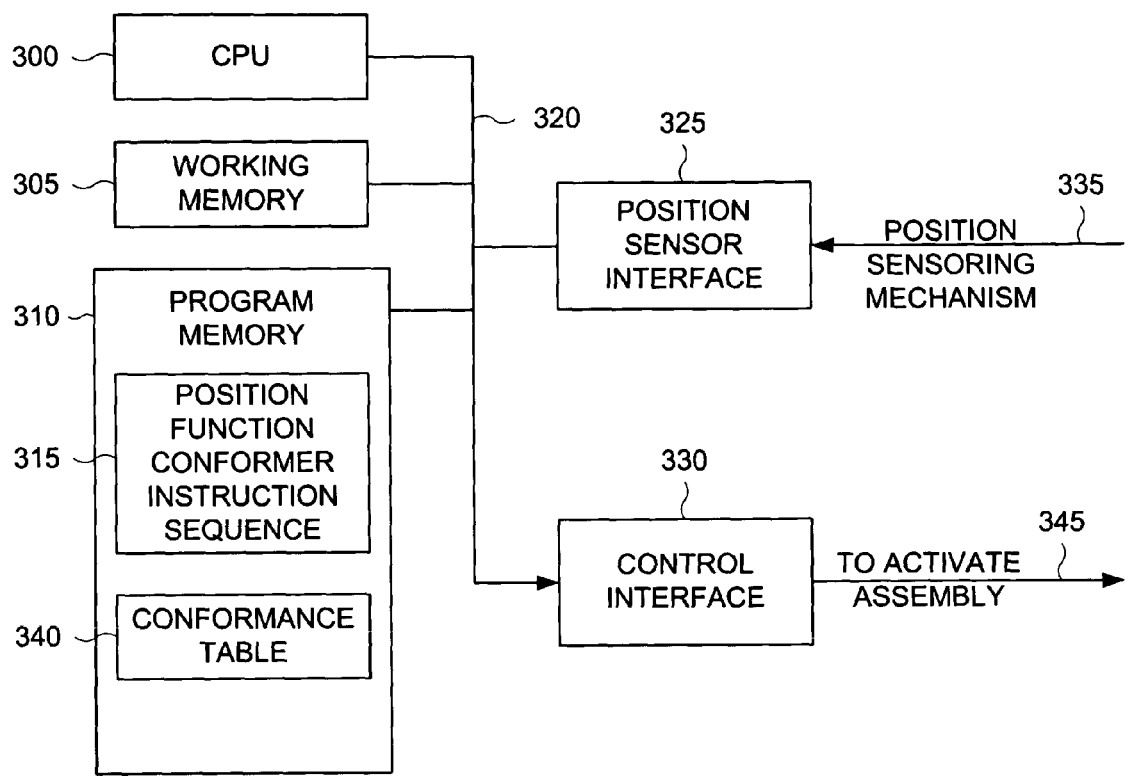
FIG. 9 is a block diagram of an exemplary embodiment of a position controller.
FIG. 10 is one example of a conformance table used in an exemplary embodiment to construct an empirical position function.

FIG. 9 is a block diagram of an exemplary embodiment of a position controller. This example embodiment of a position controller 227 comprises a central processing unit (CPU) 300, working memory 305, program memory 310 and a position sensor interface 325 all interconnected by a system bus 320. The program memory has stored therein a collection of instruction sequences comprising a position function conformer instruction sequence 315. According to one exemplary mode of operation of the position controller 227, an electrical signal 335 is received by the position sensor interface 325 from an optical position sensing mechanism 225. According to one alternative embodiment, the position sensor interface 325 comprises an analog-to-digital converter that is capable of converting an analog signal received from the optical position sensing mechanism 225 into a digital value readable by the CPU 300. The signal (e.g. a digital value) is passed to the CPU 300, which loads the position function conformer instruction sequence 315 into working memory 305 and executes the instruction sequence. The position function conformer instruction sequence 315 minimally is capable of causing the CPU 300 to conform the received electrical signal 335 to a position function according to the present method. In one illustrative embodiment, the amplitude of the received electrical signal 335 varies linearly according to the amount of light received in the detector 250, and the amount of light received in the detector varies linearly with the position of the tape head 175. The position function, therefore, is linear in this illustrative embodiment. In one alternative embodiment, the position function is non-linear. In still another alternative embodiment, the position function is determined by empirical means, and a conformance table 340 is employed to represent a position function. Utility is achieved, provided that the position function is monotonic according to the teachings herein. It should be noted that according to one embodiment the conformance table 340 is stored in the program memory 310. According to another illustrative embodiment, executing the position function conformer instruction sequence 315 produces a position indication as a result. The CPU 300 passes this position indication over the system bus 320 to the control interface 330. The control interface 330 receives the position indication and converts it to a control signal 345. The control interface 330 further conveys the control signal 345 to the actuator assembly 190.

FIG. 10 is one example of a conformance table used in an exemplary embodiment to construct an empirical position function. In this example embodiment, a position function is constructed empirically from measurements performed on the tape head 175 as mounted on the actuator assembly 190. The tape head 175 is placed at a known position, and the electrical signal 335 received from the optical position sensing mechanism 225 is noted and converted to a numerical value. The position of the tape head 175 is converted to a numerical value that is entered into the "position" column 342 of the conformance table 340, and the numerical value of the electrical signal 335 is entered into the "value" column 343 of the conformance table 340. The tape head 175 then is placed at a different known position, and the process is repeated with table entries being entered on successive new lines of the conformance table 340. Repetitions of this procedure can yield a conformance table 340 with sufficient data that an interpolating position function can be used by the position conformer instruction sequence 315 to infer the position of the head for any signal 335 value received from the optical position sensing mechanism 225.

While the present method, apparatus, and tape drive have been described in terms of several alternative methods and embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for sensing position of a tape head in a tape drive comprising:
   generating light;
   eclipsing in a tapered manner an amount of the light according to a position of the tape head;
   sensing the amount of light not eclipsed; and
   inferring position of the tape head according to the sensed amount of light.

2. The method of claim 1 wherein eclipsing the light comprises monotonically blocking an amount of light.

3. The method of claim 1 wherein sensing the amount of light comprises:
   receiving a non-eclipsed portion of the light; and
   converting the non-eclipsed portion of the light to an electrical signal.

4. The method of claim 1 wherein inferring position comprises:
   receiving an indication of an amount of non-eclipsed light; and
   conforming the electrical signal to a position function.

5. The method of claim 4 wherein conforming the electrical signal comprises applying a linearity function to the signal.

6. The method of claim 4 wherein conforming the electrical signal comprises applying a segmented position function.

7. An apparatus for sensing position of a tape head comprising:
   light source that generates light;
   eclipsing device that eclipses light in a tapered manner according to a position of the tape head;
   light sensor that senses the amount of light not eclipsed; and
   position unit that infers position of the tape head according to the sensed amount of light.

8. The apparatus of claim 7 wherein the eclipsing device is capable of monotonically blocking an amount of light according to position.

9. The apparatus of claim 7 wherein the light sensor is capable of:
   receiving a non-eclipsed portion of the light; and
   converting the non-eclipsed portion of the light to an electrical signal.

10. The apparatus of claim 7 wherein the position unit is capable of:
    receiving an electrical signal indicative of the amount of non-eclipsed light; and
    conforming the electrical signal to a position function.

11. The apparatus of claim 10 wherein the position unit conforms the electrical signal by applying a linearity function to the signal.

12. The apparatus of claim 7 wherein the position unit is capable of conforming the electrical signal to a segmented position function.

13. A tape drive comprising:
    tape transport mechanism for transporting magnetic tape;
    tape head;
    actuator assembly capable of positioning the tape head;
    optical position sensor mechanism having a tapered light eclipsing response that generates a position signal according to the position of the tape head; and
    position controller that controls the actuator assembly according to the position signal.

14. The tape drive of claim 13 wherein the optical position sensor mechanism comprises:
    light-source that generates light;
    flag that eclipses light according to the position of the tape head; and
    detector that senses the amount of light not eclipsed.

15. The tape drive of claim 14 wherein the light source comprises a light emitting diode.

16. The tape drive of claim 14 wherein the flag comprises a tapered slot for monotonically blocking an amount of light according to the position of the tape head.

17. The tape drive of claim 14 wherein the detector comprises a photodiode.

18. The tape drive of claim 14 wherein the position controller is capable of:
    receiving an electrical signal indicative of the amount of light sensed by the detector; and
    conforming the electrical signal to a position function.

19. The tape drive of claim 14 wherein the position controller comprises:
    processor for executing an instruction sequence;
    program memory; and
    position function conformer instruction sequence that is stored in the program memory.

20. The tape drive of claim 14 wherein the light source and the detector are collectively housed in opposition to each other.

* * * * *

UNITED STATES PATENT AND TRADEMARK OFFICE
CERTIFICATE OF CORRECTION

PATENT NO. : 7,002,771 B2  Page 1 of 1
APPLICATION NO. : 10/644627
DATED : February 21, 2006
INVENTOR(S) : Leslie G. Christie, Jr. et al.

It is certified that error appears in the above-identified patent and that said Letters Patent is hereby corrected as shown below:

In column 3, line 39, delete "15" and insert -- 115 --, therefor.

Signed and Sealed this

Second Day of November, 2010

David J. Kappos
*Director of the United States Patent and Trademark Office*